United States Patent
Watanabe et al.

(10) Patent No.: US 9,399,497 B2
(45) Date of Patent: Jul. 26, 2016

(54) STRADDLE VEHICLE

(71) Applicant: Kawasaki Jukogyo Kabushiki Kaisha, Kobe-shi, Hyogo (JP)

(72) Inventors: Daisuke Watanabe, Kakogawa (JP); Taiga Takahashi, Akashi (JP); Shinsuke Nakazato, Kakogawa (JP); Takakiyo Yoshikawa, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/943,713

(22) Filed: Jul. 16, 2013

(65) Prior Publication Data

US 2014/0021695 A1    Jan. 23, 2014

(30) Foreign Application Priority Data

Jul. 17, 2012   (JP) .................. 2012-158296

(51) Int. Cl.
*B62K 25/08* (2006.01)
*B62K 21/06* (2006.01)

(52) U.S. Cl.
CPC ................. *B62K 25/08* (2013.01); *B62K 21/06* (2013.01)

(58) Field of Classification Search
CPC ........ B62K 19/30; B62K 19/32; B62K 21/02; B62K 21/06; B62K 21/08; B62K 21/18; B62K 21/20; B62K 21/22; B62K 21/24
USPC ................................. 280/279, 280
See application file for complete search history.

(56) References Cited

U.S. PATENT DOCUMENTS

| | | | | |
|---|---|---|---|---|
| 4,189,167 A | * | 2/1980 | Dubois | 280/279 |
| 4,201,397 A | * | 5/1980 | Matthias | 280/280 |
| 4,573,698 A | * | 3/1986 | Takahashi et al. | 280/279 |
| 5,353,888 A | * | 10/1994 | Tsukahara | 180/219 |
| 7,204,502 B2 | * | 4/2007 | Tange | 280/276 |
| 8,528,927 B2 | * | 9/2013 | Mori et al. | 280/279 |

FOREIGN PATENT DOCUMENTS

| | | |
|---|---|---|
| JP | H02010072 Y2 | 3/1990 |
| JP | H02072194 U | 6/1990 |
| JP | H02024712 Y2 | 7/1990 |
| JP | H06037034 Y2 | 9/1994 |
| JP | 2000280966 A | 10/2000 |

* cited by examiner

*Primary Examiner* — Joseph Rocca
*Assistant Examiner* — Felicia L Brittman
(74) *Attorney, Agent, or Firm* — Alleman Hall McCoy Russell & Tuttle LLP

(57) ABSTRACT

A straddle vehicle includes a steering stem coupled to a handle; a head pipe into which the steering stem is inserted; and a ring-shaped seal member provided at an end portion of the head pipe to seal a gap between the head pipe and the steering stem; wherein the seal member has a lip portion provided on an inner peripheral portion thereof and an engagement portion provided on an outer peripheral portion thereof; wherein the engagement portion is engaged with an inner peripheral surface of the head pipe; and wherein the lip portion is biased to slidably contact an outer peripheral portion of the steering stem.

16 Claims, 3 Drawing Sheets

STRADDLE VEHICLE

CROSS-REFERENCE TO RELATED APPLICATIONS

This application claims priority to and the benefit of Japanese Patent Application No. 2012-158296 filed on Jul. 17, 2012, the entire disclosure of which is incorporated herein by reference.

BACKGROUND OF THE INVENTION

1. Field of the Invention

The present invention relates to straddle vehicles such as a motorcycle, an electric two-wheeled vehicle, or an automated three-wheeled vehicle. Particularly, the present invention relates to a straddle vehicle having a structure for preventing entry of foreign matters into a head pipe.

2. Description of the Related Art

Japanese Examined Utility Model Application Publication No. Hei. 6-37034 discloses an exemplary steering device of a straddle vehicle. This steering device includes a steering stem coupled to a handle and inserted into a cylindrical head pipe. The steering stem is supported by the head pipe and is rotatable together with the handle.

The head pipe has a bearing retaining section for retaining a bearing at an end portion thereof. The steering stem is rotatably supported by the bearing. A nut is threadingly engaged with a portion of an outer periphery of the steering stem which is located above the head pipe. After the steering stem is inserted into the head pipe retaining the bearing, the nut is rotated and displaced in a downward direction. Thus, the bearing is pressed against the bearing retaining section and fastened to the head pipe. In addition, the head pipe is provided at an end portion thereof with a cover member having a sealing capability to prevent water, dust and other material from entering inside of the head pipe.

In this steering device, an inner peripheral portion of the cover member is sandwiched between an upper surface of the bearing and a lower surface of a steering nut. The cover member covers an opening of the head pipe. The cover member is provided at an outer peripheral portion thereof with a seal retaining section protruding downward in a location which is radially outward relative to an outer peripheral surface of the head pipe. A seal member is mounted to an inner peripheral surface of the seal retaining section. A lip of the seal member is sealingly attached to the outer peripheral surface of the head pipe.

In this configuration, to enable the seal member to appropriately perform a sealing function, it is necessary to control a distance from the outer peripheral surface of the head pipe to the seal retaining section. To this end, the outer peripheral surface of the head pipe is required to be processed, which may make manufacturing steps of the head pipe complicated. If an upper end portion of the head pipe, which is easily visible from a driver straddling the vehicle, is covered with the cover member, an external appearance of the steering device may be impaired.

SUMMARY OF THE INVENTION

The present invention addresses the above described conditions, and an object of the present invention is to provide a steering device of a straddle-vehicle which can lessen complexity of manufacturing steps of the head pipe and improve an external appearance of the head pipe.

The present invention is directed to achieving the above object. A straddle vehicle of the present invention comprises a steering stem coupled to a handle; a head pipe into which the steering stem is inserted; and a ring-shaped seal member provided at an end portion of the head pipe to seal a gap between the head pipe and the steering stem; wherein the seal member has a lip portion provided on an inner peripheral portion thereof and an engagement portion provided on an outer peripheral portion thereof; wherein the engagement portion is engaged with an inner peripheral surface of the head pipe; and wherein the lip portion is biased to slidably contact an outer peripheral portion of the steering stem.

In accordance with this configuration, the engagement portion provided on the outer peripheral portion of the seal member is engaged with the inner peripheral surface of the head pipe. Since the steering stem is inserted into the inner peripheral surface of the head pipe, the dimension of the inner peripheral surface of the head pipe is controlled in advance. Therefore, it becomes possible to avoid a situation in which a portion which requires special dimension control in the head pipe to mount the seal member to the end portion of the head pipe increases. Hence, it becomes possible to suppress complexity of manufacturing steps of the head pipe. By using the structure for engaging the seal member with the inner peripheral surface of the head pipe, it becomes possible to prevent a situation in which the seal member covers the end portion of the head pipe, and reduce a size of the seal member. Thus, an external appearance of the straddle vehicle can be improved.

The above and further objects, features and advantages of the invention will more fully be apparent from the following detailed description with reference to the accompanying drawings.

DETAILED DESCRIPTION OF THE PREFERRED EMBODIMENTS

Figure 1:
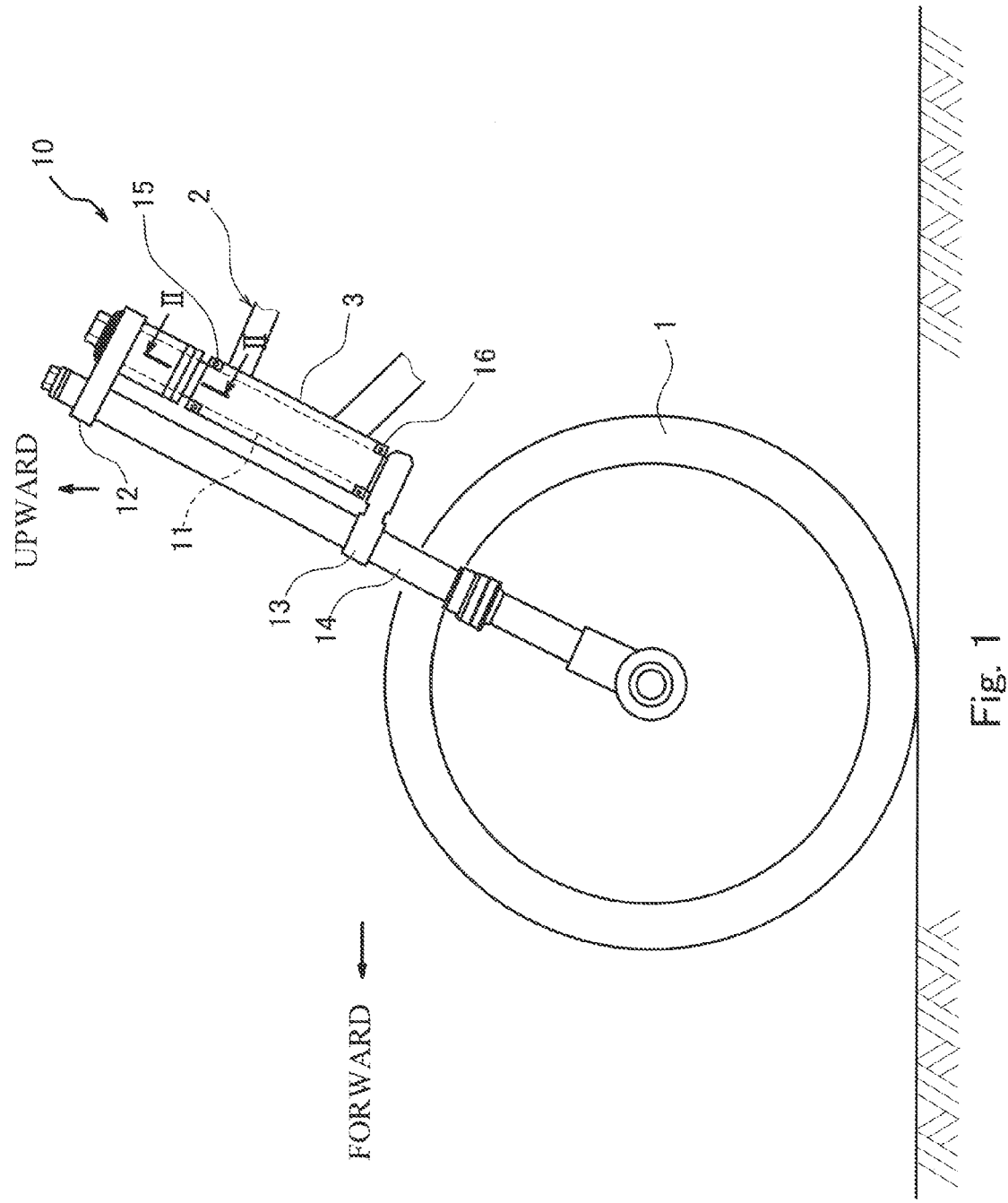
FIG. 1 is a left side view showing a steering device in a straddle vehicle according to an embodiment of the present invention.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in the straddle vehicle unless otherwise explicitly noted.

FIG. 1 is a left side view showing a steering device in a straddle vehicle according to an embodiment of the present invention. As shown in FIG. 1, the straddle vehicle such as a motorcycle, an electric two-wheeled vehicle, an automated three-wheeled vehicle, or an ATV (all terrain vehicle), includes a steering device 10 for changing a direction of a front wheel 1 in response to the driver's steering operation. The steering device 10 includes a steering stem 11 inserted into a cylindrical head pipe 3 constituting a front portion of a vehicle body frame 2. An upper end portion of the steering stem 11 is fastened to an upper bracket 12, while a lower end portion of the steering stem 11 is fastened to an under bracket 13. The upper bracket 12 and the under bracket 13 are arranged in parallel to be spaced apart from each other in an axial direction of the steering stem 11. A pair of front forks 14 sandwiching the steering stem 11 from right and left sides are fastened to the upper bracket 12 and the under bracket 13. The front forks 14 extend in parallel with the steering stem 11. The front forks 14 extend downward from the upper bracket 12 and penetrate the under bracket 13. The front wheel 1 is placed between lower end portions of the pair of front forks 14 and rotatably mounted to the lower end portions of the front forks 14.

The steering stem 11 is coupled to a handle (not shown) fastened to an upper surface of the upper bracket 12, via the upper bracket 12. When the driver rotates the handle, the steering stem 11 coupled to the handle is guided by the head pipe 3 and thereby rotates. An upper bearing 15 and a lower bearing 16 are mounted to the upper end portion and the lower end portion of the head pipe 3, respectively. The steering stem 11 is rotatable in a state in which it is supported by the upper and lower bearings 15 and 16. According to the rotation of the steering stem 11, the upper bracket 12, the under bracket 13, and the front fork 14 rotate around a rotational axis of the steering stem 11. Thus, the front wheel 1 changes its direction according to the rotation of the handle.

Figure 2:
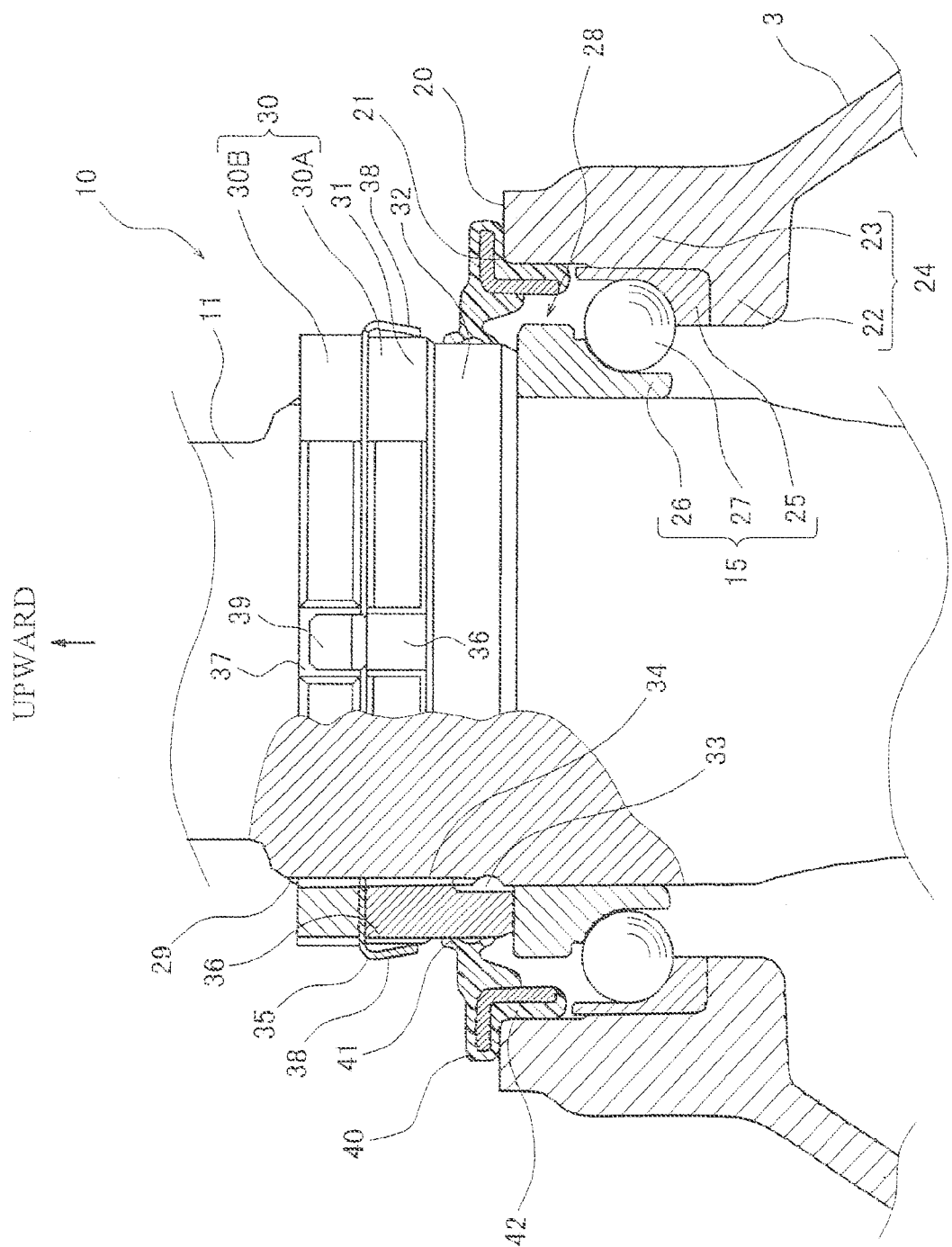
FIG. 2 is a cross-sectional view showing a region including an upper end portion of a steering stem of FIG. 1.
Figure 3:
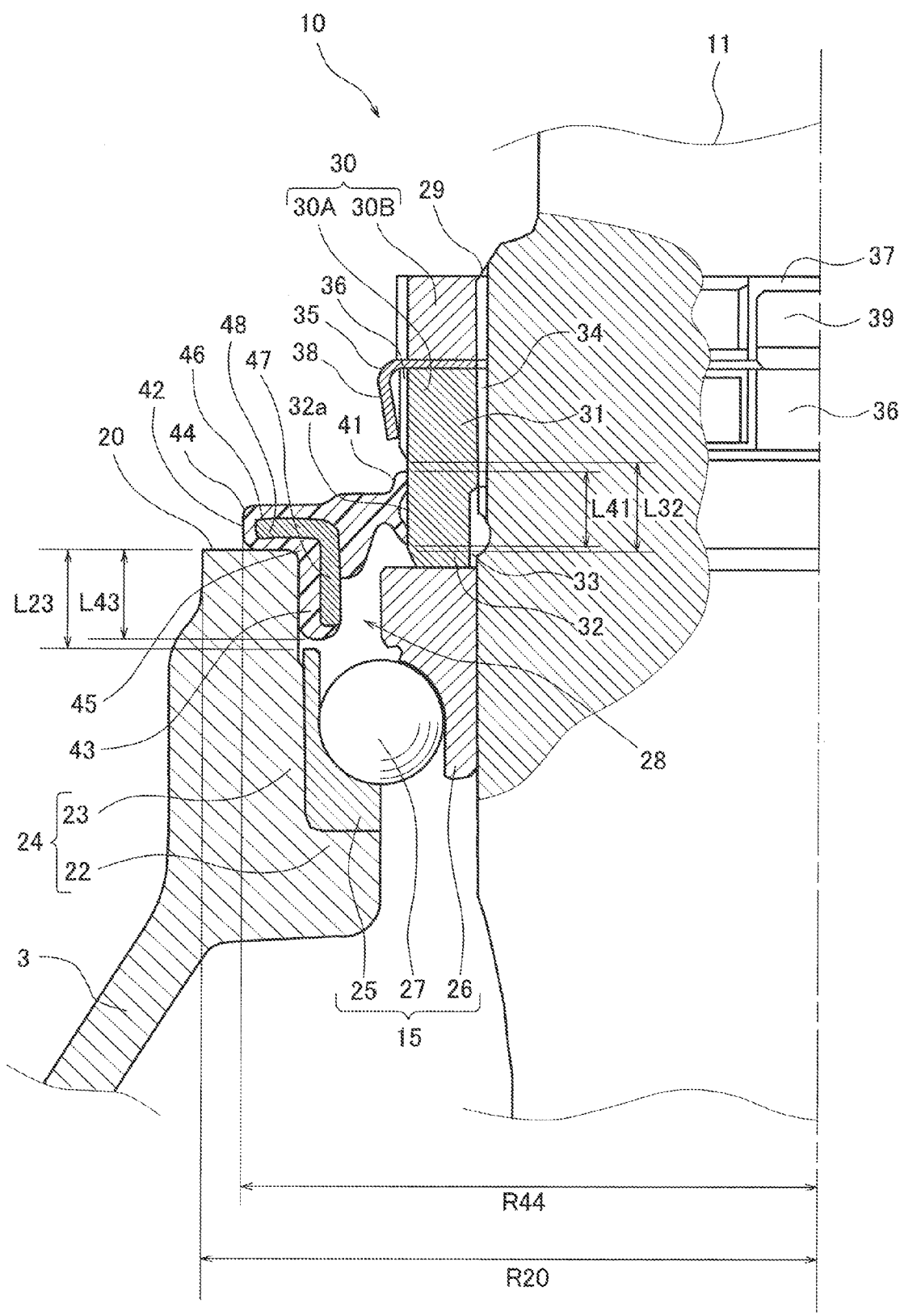
FIG. 3 is a partially enlarged view of FIG. 2.

FIG. 2 is a cross-sectional view showing a region including the upper end portion of the head pipe 3, which is taken along line II-II of FIG. 1. FIG. 3 is a partially enlarged view of FIG. 2. As shown in FIG. 2, the head pipe 3 has at the upper end thereof a ring-shaped upper end surface 20 and a circular opening 21 defined by the upper end surface 20. The head pipe 3 is manufactured by molding using metal such as aluminum alloy. Thereafter, portions which require dimension control, such as an inner peripheral surface of the head pipe 3, are processed by machining, specifically, cutting. The head pipe 3 has a protruding portion 22 protruding radially inward from an inner peripheral surface of the upper end portion in a location below the upper end portion. The protruding portion 22 and a tubular portion 23 including a portion which is present above the protruding portion 22 constitute a bearing retaining section 24 for retaining the bearing 15. Thus, the bearing retaining section 24 is provided at an inner peripheral side of the upper end portion of the head pipe 3. The bearing retaining section 24 is processed by cutting for the purpose of dimension control.

The bearing 15 has an outer ring 25, an inner ring 26 and a rolling element 27. The bearing 15 is fitted into the bearing retaining section 24 through the opening 21 from above the head pipe 3. The outer ring 25 is placed inside of the head pipe 3 in such a way that its outer peripheral surface is fitted to an inner peripheral surface of the tubular portion 23 and its lower end surface is in contact with an upper surface of the protruding portion 22. In this state, the bearing 15 is retained by the bearing retaining section 24. The inner ring 26 is mounted to an outer peripheral surface of the steering stem 11 inserted into the head pipe 3.

The bearing 15 is constituted by an angular ball bearing having a single row, which enables the bearing 15 to support a radial load and an axial load from the steering stem 11. The outer ring 25 and the inner ring 26 are axially deviated from each other. In a state in which the bearing 15 is retained by the bearing retaining section 24, the outer ring 25 is deviated in a downward direction from the inner ring 26. For this reason, a lower end surface of the outer ring 25 is located below a lower end surface of the inner ring 26, and hence the lower end surface of the inner ring 26 is located above the upper surface of the protruding portion 22. An upper end surface of the inner ring 26 is located above an upper end surface of the outer ring 25. An upper end surface of the outer ring 25 and an upper end surface of the rolling element 27 are located below the upper end surface 20 of the head pipe 3. The upper end surface of the inner ring 26 is placed above the upper end surface of the outer ring 25 and the upper end surface of the rolling element 27. In the present embodiment, the upper end surface of the inner ring 26 is located below the upper end surface 20 of the head pipe 3. An engagement peripheral wall portion 43 (described later) faces an outer peripheral surface of the inner ring 26, which makes it possible to prevent interference between the outer ring 25 and the inner ring 26 with the engagement peripheral wall portion 43. Although the axial dimension of the overall seal member 40 increases because of the presence of the engagement peripheral wall portion 43, an increase in an axial dimension of a circular tubular portion 32 (described later) which contacts the seal member 40 can be avoided.

The upper end surface of the inner ring 26 is located below the opening 21 of the head pipe 3, thereby allowing the bearing 15 to be entirely accommodated into the head pipe 3. In this state, a relatively large dimension in the axial direction is ensured in the upper end portion of the head pipe 3, between the opening 21 and the upper end of the outer ring 25. A ring-shaped space 28 is formed in the upper end portion of the head pipe 3, the ring-shaped space 28 having a ring-shaped cross-section, and defined by the upper portion of the inner peripheral surface of the tubular portion 23, the upper end of the outer ring 25 and the upper portion of the inner peripheral surface of the inner ring 26. In particular, the upper end portion of the outer ring 25 has a radial thickness smaller than that of the lower end portion of the outer ring 25. Because of this, the ring-shaped space 28 has a relatively great radial thickness.

The steering stem 11 is inserted into the head pipe 3 in a state in which the bearing 15 is retained in the bearing retaining section 24. The steering stem 11 is inserted into the inner peripheral side of the inner ring 26 at the upper end portion of the head pipe 3 and rotatably supported by the bearing 15. A thread 29 is formed on the outer peripheral surface of the steering stem 11 in a location above a portion which is assumed to sealingly contact the inner peripheral surface of the inner ring 26. A steering nut 30 is threadingly engaged with the thread 29 formed on the outer peripheral surface of the steering stem 11. By rotating the steering nut 30 and moving it downward in the axial direction of the steering stem 11, a lower end surface of the steering nut 30 is brought into contact with the upper end surface of the inner ring 26. By rotating and tightening the steering nut 30, the bearing 15 (lower end surface of the outer ring 25) is pressed against the upper end surface of the protruding portion 22. In this way, the bearing 15 can be firmly retained by the bearing retaining section 24 by using the steering nut 30.

The steering nut 30 includes a lower nut 30A and an upper nut 30B. The lower nut 30A has a variant tubular portion 31 and a circular tubular portion 32. The variant tubular portion 31 has a non-circular outer shape when viewed from the axial direction, while the circular tubular portion 32 has a circular outer shape when viewed from the axial direction. The upper nut 30B has a shape similar to that of the variant tubular portion 31 of the lower nut 30A. In the present embodiment, the variant tubular portion 31 has grooves 36 arranged on its outer peripheral surface at equal intervals in a circumferential direction, while the upper nut 30B has grooves 37 arranged on its outer peripheral surface at equal intervals in the circumferential direction.

Initially, a fastener tool such as a spanner is put on the variant tubular portion 31 of the lower nut 30A, to rotate and tighten the lower nut 30A. The variant tubular portion 31 is positioned above the circular tubular portion 32. Because of this, even when the lower nut 30A is moved in a downward direction, the variant tubular portion 31 can be exposed above the opening 21. Therefore, the lower nut 30A can be rotated and tightened easily by using the fastener tool. Because of the presence of the grooves 36, the variant tubular portion 31 has a non-circular outer shape when viewed from the axial direction. By utilizing the grooves 36, the lower nut 30A can be rotated and tightened easily by using the fastener tool. The circular tubular portion 32 constitutes a lower end portion of the steering nut 30 (lower nut 30A). A lower end surface of the circular tubular portion 32 contacts the upper end surface of the inner ring 26. In the present embodiment, the bearing 15 is entirely accommodated into the head pipe 3. Therefore, a small portion of the lower end portion of the circular tubular portion 32 is located inside of the head pipe 3 via the opening 21, while the upper end portion of the circular tubular portion 32 is exposed above the opening 21. The lower nut 30A and the upper nut 30B constituting the steering nut 30 have a through-hole 33 in the axial direction to be threadingly engaged with the outer peripheral surface of the steering stem 11. A female thread 34 is formed on an inner peripheral surface of the through-hole 33 to be threadingly engaged with the thread 29 of the steering stem 11. The female thread 34 may not be formed over an entire portion from the variant tubular portion 31 to the circular tubular portion 32, in the axial direction of the steering nut 30.

After rotating and tightening the lower nut 30A, a washer 35 is placed on an upper end surface of the variant tubular portion 31. The washer 35 has a plurality of hooks 38 and 39 protruding radially. The hooks 38 are bent downwardly and are engaged with the grooves 36 of the lower nut 30A. In this state, the upper nut 30B is rotated and tightened, so that the washer 35 is sandwiched between the upper nut 30B and the lower nut 30A. Circumferential positions of the grooves 37 of the upper nut 30B conform to circumferential positions of the hooks 39 of the washer 35. The hooks 39 are bent upward and engaged with the grooves 37 of the upper nut 30B. Since the steering nut 30 is composed of the upper and lower portions, i.e., the lower nut 30A and the upper nut 30B as described above, a weight of the steering nut 30 can be reduced as a whole. Since the washer 35 intervenes between the lower nut 30A and the upper nut 30B, and the hooks 38 and 39 provided on the washer 35 are engaged with the lower nut 30A and the upper nut 30B, respectively, it becomes possible to prevent the lower nut 30A from being disengaged or getting loose.

The ring-shaped seal member 40 is provided on the upper end portion of the head pipe 3. At least a seal portion (e.g., lip portion 41) of the seal member 40 is made of a relatively flexible material such as rubber. The seal member 40 is able to seal a gap between the head pipe 3 and the steering stem 11, which is formed at the upper end portion of the head pipe 3.

The seal member 40 has the lip portion 41 provided on its inner peripheral portion and an engagement portion 42 provided on its outer peripheral portion. The engagement portion 42 is engaged with an end portion (in the present embodiment, upper end portion) of the inner peripheral surface of the head pipe 3. This makes it possible to inhibit the seal member 40 from being displaced downwardly and radially. The lip portion 41 is biased to slidably contact the circular tubular portion 32 of the steering nut 30 which is at an outer peripheral side of the steering stem 11.

It should be noted that the inner peripheral surface of the upper end portion of the head pipe 3 is a portion which requires dimension control so that the steering stem 11 is inserted thereinto and/or the bearing 15 is mounted thereto. The engagement portion 42 is provided on the outer peripheral portion of the seal member 40. The engagement portion 42 is in contact with the inner peripheral surface of the upper end portion of the head pipe 3 and thus the seal member 40 is inhibited from being displaced downwardly. In view of this, it is not necessary to form a seal contact surface with which the seal portion (e.g., lip portion 41) contacts, by cutting, when the seal member 40 is provided on the upper end portion of the head pipe 3. In other words, it becomes possible to avoid a situation in which a portion which requires special dimension control in the head pipe 3 increases. Hence, it becomes possible to suppress complexity of manufacturing steps of the head pipe 3. By comparison, the lip portion 41 is provided on the inner peripheral portion of the seal member 40. Because of this, a radius and a circumferential length of the lip portion 41 can be reduced relatively. This can reduce a rotating resistance in the steering stem 11 which would be caused by sliding of the steering stem 11 in sealing contact with the head pipe 3. As a result, the steering feeling (i.e., handling) can be improved.

As shown in FIG. 3, the engagement portion 42 has a ring-shape having a bent cross-section. The engagement portion 42 has a cylindrical engagement peripheral wall portion 43 and an engagement flange portion 44 extending radially outward from a base end portion of the cylindrical engagement peripheral wall portion 43 continuously with the cylindrical engagement peripheral wall portion 43. The cylindrical engagement peripheral wall portion 43 and the engagement flange portion 44 have a substantially-L-shape, which is an example of the bent cross-section, which is taken along the axial direction. The seal member 40 is mounted to the upper end portion of the head pipe 3 from above in such a manner that a tip end portion of the cylindrical engagement peripheral wall portion 43 protrudes downward to be farther than the engagement flange portion 44. The cylindrical engagement peripheral wall portion 43 is fitted into inside of the head pipe 3 through the opening 21. The cylindrical engagement peripheral wall portion 43 has an outer diameter which is slightly larger than an inner diameter of the tubular portion 23. This allows the cylindrical engagement peripheral wall portion 43 to sealingly contact the inner peripheral surface (inner peripheral surface of the tubular portion 23) of the upper end portion of the head pipe 3 in a state in which the cylindrical engagement peripheral wall portion 43 is pressed and crushed radially. A lower end surface of the engagement flange portion 44 is in sealing contact with the upper end surface 20 of the head pipe 3. A corner portion 45 defined by an outer peripheral surface of the cylindrical engagement peripheral wall portion 43 and a lower end surface of the engagement flange portion 44 is in sealing contact with a peripheral portion of the opening 21 defined by the upper end surface 20 of the head pipe 3 and the inner peripheral surface of the tubular portion 23.

Thus, the ring-shaped engagement portion 42 having the bent cross-section is engaged with the inner peripheral surface of the head pipe 3 and the upper end surface 20 of the head pipe 3. This allows the outer peripheral portion of the seal member 40 to be in sealing contact with the inner peripheral surface and the upper end surface 20 of the head pipe 3 over the entire peripheral portion of the opening 21 of the head pipe 3. Therefore, the seal member 40 can be firmly fastened to the head pipe 3, and the gap between the head pipe 3 and the steering stem 11 can be sealed by the engagement portion 42.

The engagement portion 42 is embedded with a reinforcement member 46. The reinforcement member 46 is made of metal such as steel or aluminum alloy. Because the reinforcement member 46 is embedded into the engagement portion 42, the seal member 40 can be properly mounted between the steering stem 11 and the head pipe 3 such that the flexible lip portion 41 provided on the inner peripheral portion of the seal member 40 is not crushed excessively, when the steering stem 11 is mounted to the head pipe 3. In addition, since the reinforcement member 46 is embedded into the engagement portion 42, a state in which the engagement portion 42 is engaged with the head pipe 3 as described above can be maintained. This enables the seal member 40 to suitably perform sealing performance.

In the present embodiment, the reinforcement member 46 has the same shape as that of the engagement portion 42, and has a substantially-L-shaped bent cross-section, which is taken along the axial direction. The reinforcement member 46 has a reinforcement peripheral wall portion 47 embedded into the cylindrical engagement peripheral wall portion 43 and a reinforcement flange portion 48 embedded into the engagement flange portion 44 and extending continuously from the reinforcement peripheral wall portion 47. The reinforcement peripheral wall portion 47 has a cylindrical shape. The reinforcement flange portion 48 has a ring-shape and protrudes radially outward from an upper end portion of the reinforcement peripheral wall portion 47. Because the reinforcement member 46 has the substantially-L-shaped bent cross-section like the engagement portion 42 and is embedded into the engagement portion 42 from the cylindrical engagement peripheral wall portion 43 to the engagement flange portion 44, the reinforcement member 46 exerts a resilient force to suppress the engagement flange portion 44 from being displaced upward and disengaged from the upper end surface 20. This makes it possible to suitably maintain a state in which the engagement portion 42 is engaged with the upper end surface 20 and the inner peripheral surface of the head pipe 3.

A portion of the reinforcement member 46 is sandwiched from both sides in a thickness direction thereof in an upper region of the seal member 40. An inner peripheral surface of the reinforcement member 46 is exposed inwardly in a lower region of the seal member 40. Since the portion of the reinforcement member 46 sandwiched from both sides is lessened in this way, the reinforcement member 46 can be easily embedded into the engagement portion 42 and the lip portion 41 after the engagement portion 42 and the lip portion 41 are formed. In other words, since a bag-shaped space into the reinforcement member 46 is embedded is formed in an upper region of the engagement portion 42 and is opened in a lower region of the engagement portion 42, the reinforcement member 46 can be easily embedded thereafter into this opened space.

In the seal member 40 of the present embodiment, the reinforcement member 46 is embedded only into the engagement portion 42. That is, the reinforcement member 46 is not embedded into the lip portion 41 or a portion connecting the lip portion 41 and the engagement portion 42 to each other. Because of this, flexibility of a portion of the seal member 40 which is in the vicinity of the lip portion 41 can be increased. This makes it possible to prevent a state in which the seal member 40 rotates together with the steering stem 11, and attain a state in which the lip portion 41 is in contact with the circular tubular portion 32 of the steering nut 30 which is at the outer peripheral side of the steering stem 11.

A radius R44 of an outer periphery of the engagement flange portion 44 of the seal member 40 is smaller than a radius R20 of an outer periphery of the upper end surface 20 of the head pipe 3. Therefore, the outer periphery of the engagement flange portion 44 is located radially inward relative to the outer periphery of the head pipe 3. This can reduce the size of the seal member 40 as much as possible. Also, it is possible to avoid a state in which the upper end portion of the head pipe 3 which is easily seen by the driver straddling the straddle vehicle is entirely covered with a rubber member, which can improve an external appearance of the steering device 10. In addition, since the engagement portion 42 is engaged with the inner peripheral surface and the upper end surface 20 of the head pipe 3, and the reinforcement member 46 is embedded into the engagement portion 42, the seal member 40 can be firmly engaged with the head pipe 3 in a sealing contact state even when the radius R44 of an outer periphery of the engagement flange portion 44 is reduced. As a result, high sealing performance can be ensured.

The lip portion 41 is biased radially to slidably contact an outer peripheral surface 32a of the circular tubular portion 32 of the steering nut 30 such that it is pressed and crushed radially on the outer peripheral surface 32a of the circular tubular portion 32.

In this way, the lip portion 41 of the seal member 40 seals the gap between the head pipe 3 and the steering stem 11. Thus, in the present embodiment, the outer peripheral surface 32a of the circular tubular portion 32 serves as a lip contact surface which is formed on the outer peripheral side of the steering stem 11 so that the lip 41 contacts the lip contact surface.

The lip portion 41 is positioned above the upper end surface of the inner ring 26 and is in contact with the outer peripheral surface 32a of the circular tubular portion 32 of the steering nut 30. A tip end (lower end) of the cylindrical engagement peripheral wall portion 43 is placed in the above stated ring-shaped space, and is positioned above the upper end of the outer ring 25 and radially outward relative to the outer peripheral surface of the inner ring 26. In this way, the seal member 40 covers the bearing retaining section 24 from above and is placed apart from the bearing 15 retained in the bearing retaining section 24. Therefore, it becomes possible to prevent a situation in which foreign matters enter the bearing retaining section 24, and hence to cause the steering stem 11 to rotate smoothly. In addition, it becomes possible to prevent a situation in which the bearing 15 becomes a sliding resistance to the seal member 40. As a result, the steering feeling (i.e., handling) perceived by the driver can be improved.

In the present embodiment, the engagement portion 42 is fitted into and engaged with the head pipe 3, while the bearing 15 for supporting the steering stem 11 is retained at the inner peripheral side of the upper end portion of the head pipe 3. The bearing 15 is the angular ball bearing in which the outer ring 25 and the inner ring 26 are axially deviated from each other and the upper end surface of the outer ring 25 is positioned below the upper end surface of the inner ring 26. Therefore, it becomes possible to easily avoid a situation in which the cylindrical engagement peripheral portion 43 contacts the bearing 15 (e.g., upper end of the outer ring 25) even when the axial length of the cylindrical engagement peripheral portion 43 is increased, and attain a state in which the engagement portion 42 is firmly engaged with the inner peripheral surface and the upper end surface 20 of the head pipe 3. The bearing 15 is manufactured under severe dimension control, and the bearing retaining section 24 is manufactured under dimension control. Therefore, in a state in which the bearing 15 is retained in the bearing retaining section 24, a distance L23 (or distance range) from the upper end surface 20 to the upper end of the outer ring 25 can be ensured. The axial length L43 of the cylindrical engagement peripheral portion 43 (in the present embodiment, axial length from the lower end surface of the engagement flange portion 44 to the tip end of the cylindrical engagement peripheral portion 43) is set shorter than the distance L23. Therefore, it becomes possible to avoid the engagement peripheral portion 43 from interfering with the outer ring 25.

A substantially entire portion of the circular tubular portion 32 is positioned above the upper end surface 20 of the head pipe 3. The lip portion 41 is in sealing contact with the outer peripheral surface of the circular tubular portion 32. This makes the seal member 40 inclined in a downward direction from the inner peripheral portion thereof corresponding to the lip portion 41 to the outer peripheral portion thereof corresponding to the engagement portion 42. Because of this structure, it becomes possible to prevent a situation in which foreign matters such as water stay in the inner peripheral portion thereof corresponding to the lip portion 41. Therefore, it becomes possible to prevent a situation in which the foreign matters break through the lip portion 41 and enter the gap between the head pipe 3 and the steering stem 11. The lip portion 41 has a double-lip structure including two lip portions arranged in the axial direction. Because of this double-lip structure, it becomes possible to prevent a situation in which the foreign matters break through the lip portion 41 from above and move in the axial direction.

An axial length L41 of the lip portion 41 from the upper end portion to the lower end portion is set shorter than an axial length L32 of the circular tubular portion 32. Even if an error from the lower end side of the steering stem 11 in mounting of the steering stem 11 is accumulated, and thereby a vertical position of the steering nut 30 with respect to the seal member 40 changes, a pressing force applied between the seal member 40 and the steering stem 11 (steering nut 30) does not change substantially. Therefore, it becomes possible to prevent a situation in which seal performance and steering feeling are varied from vehicle to vehicle due to the accumulated error in assembling of a vehicle body, and attain a state in which the lip portion 41 is in sealing contact with the outer peripheral surface of the circular tubular portion 32. In other words, it becomes possible to provide a vehicle which reduces a rotating resistance and perform a smooth steering operation, without causing a variation from vehicle to vehicle. Since the seal member 40 is engaged with the head pipe 3 and does not rotate together with the steering stem 11, it becomes possible to prevent an increase in the moment of inertia due to the rotation of the steering stem 11. As a result, the driver can perform the steering operation smoothly.

Although the embodiment of the present invention has been described above, the above described configuration can be changed suitably within a scope of the present invention. The above described configuration may be provided at the lower end portion of the steering stem 11.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A straddle vehicle comprising:
a steering stem coupled to a handle;
a front fork extending in parallel with the steering stem and supporting a front wheel at a lower end portion thereof such that the front wheel is rotatable;
a head pipe into which the steering stem is inserted;
a ring-shaped seal member provided at an end portion of the head pipe to seal a gap between the head pipe and the steering stem;
a bearing retaining section provided on an inner peripheral side of the end portion of the head pipe;
a bearing retained in the bearing retaining section to support the steering stem such that the steering stem is rotatable; and
a circular tubular portion pressed against an end surface of the bearing, the circular tubular portion having a circular outer shape when viewed from an axial direction;
wherein the ring-shaped seal member has a lip portion provided on an inner peripheral portion thereof and an engagement portion provided on an outer peripheral portion thereof;
wherein the engagement portion is engaged with an inner peripheral surface of the head pipe;
wherein the lip portion extends radially inward from the engagement portion to be close to the circular tubular portion and is biased to slidably contact an outer peripheral surface of the circular tubular portion;
wherein the circular tubular portion is separate from an inner ring of the bearing;
wherein a portion of the circular tubular portion, the portion on which the lip portion slidably contacts, has a smaller outer diameter than the inner ring of the bearing, the portion of the circular tubular portion being located radially inward relative to the inner peripheral surface of the head pipe; and
wherein the bearing retaining section is placed between the inner peripheral surface of the head pipe and an outer peripheral surface of the steering stem.

2. The straddle vehicle according to claim 1,
wherein the engagement portion has a ring-shape having a bent cross-section and is in sealing contact with the inner peripheral surface of the head pipe and an end surface of the head pipe; and
wherein an outer periphery of the engagement portion is positioned radially inward relative to an outer periphery of the end surface of the head pipe.

3. The straddle vehicle according to claim 2,
wherein the ring-shaped seal member has a reinforcement member embedded into the engagement portion, and the reinforcement member has a ring-shape having an L-shaped cross-section and is placed to conform in shape to the end surface of the head pipe and the inner peripheral surface of the head pipe.

4. The straddle vehicle according to claim 1,
wherein the ring-shaped seal member is inclined in a downward direction from the inner peripheral portion to the outer peripheral portion.

5. The straddle vehicle according to claim 1,
wherein an axial length of the outer peripheral surface of the circular tubular portion is set longer than a vertical length of the lip portion, and the outer peripheral surface of the circular tubular portion protrudes upward and downward relative to the lip portion in a state in which the lip portion is in contact with the outer peripheral surface of the circular tubular portion.

6. The straddle vehicle according to claim 1,
wherein the ring-shaped seal member covers the bearing retaining section and is positioned to be apart from the bearing retained in the bearing retaining section.

7. The straddle vehicle according to claim 1, comprising a steering nut which is threadingly engaged with the steering stem;
wherein the steering nut includes a variant tubular portion and the circular tubular portion; and wherein the circular tubular portion is pressed against the end surface of the bearing by rotating and tightening the steering nut.

8. The straddle vehicle according to claim 7,
wherein the variant tubular portion has a larger outer shape than the circular tubular portion.

9. The straddle vehicle according to claim 7,
wherein the steering nut has a through-hole extending in an axial direction thereof, and the through-hole includes a first portion in which a female thread is formed, and a second portion which is closer to the bearing than the first portion in the axial direction and in which the female thread is not formed; and
wherein the lip portion is in contact with an outer peripheral surface of a portion of the steering nut in which the second portion is formed.

10. The straddle vehicle according to claim 7,
wherein a thread is formed on a portion of an outer peripheral surface of the steering stem which portion is above a portion which is in sealing contact with an inner peripheral surface of the inner ring of the bearing, and the steering nut is threadingly engaged with the thread.

11. The straddle vehicle according to claim 1,
wherein the ring-shaped seal member has a reinforcement member embedded in the engagement portion, and the reinforcement member has a ring shape having a bent cross-section.

12. The straddle vehicle according to claim 1, comprising:
a steering nut, wherein the circular tubular portion is formed by a portion of an outer peripheral surface of the steering nut, the steering nut is threadingly engaged with the steering stem and pressed against the end surface of the bearing;
wherein the lip portion is biased to slidably contact the outer peripheral surface of the steering nut; and
wherein a portion of the steering nut on which the lip portion is slidable is separate from the inner ring of the bearing and has a smaller outer diameter than the inner ring of the bearing.

13. The straddle vehicle according to claim 12,
wherein the bearing includes the inner ring, an outer ring, and a rolling element; and
wherein the outer ring is disposed in the bearing retaining section, and the inner ring is mounted to an outer peripheral surface of the steering stem.

14. The straddle vehicle according to claim 13,
wherein the portion of the steering nut on which the lip portion is slidable is located radially inward relative to a hook engaged with the steering nut.

15. The straddle vehicle according to claim 1,
wherein the head pipe has an inner diameter that is larger than an outer diameter portion of an outer ring of the bearing.

16. The straddle vehicle according to claim 1,
wherein an upper end surface of the inner ring of the bearing is located below an upper end surface of the head pipe.

* * * * *